United States Patent [19]

Hiramatsu

[11] 4,398,741
[45] Aug. 16, 1983

[54] ANTI-NOSE-DIVE APPARATUS OF A MOTORCYCLE

[75] Inventor: Kinuo Hiramatsu, Akashi, Japan

[73] Assignee: Kawasaki Jukogyo Kabushiki Kaisha, Kobe, Japan

[21] Appl. No.: 333,485

[22] Filed: Dec. 22, 1981

[30] Foreign Application Priority Data

Dec. 22, 1980 [JP] Japan .................... 55-182633

[51] Int. Cl.³ ............................................ B60G 21/04
[52] U.S. Cl. .................................. 280/283; 180/219; 180/227; 267/57; 280/275
[58] Field of Search ............... 280/283, 275, 703, 276, 280/277; 180/219, 227; 267/57

[56] References Cited

U.S. PATENT DOCUMENTS

| | | | |
|---|---|---|---|
| 2,621,058 | 12/1952 | Montrose-Oster | 267/57 |
| 2,957,701 | 10/1960 | Rich | 267/57 |
| 3,490,786 | 1/1970 | Ravenel | 267/57 |
| 3,642,083 | 2/1972 | Rodler, Jr. | 180/227 |
| 4,295,658 | 10/1981 | Kasmima | 280/703 |

Primary Examiner—Joseph F. Peters, Jr.
Assistant Examiner—Kenneth R. Rice
Attorney, Agent, or Firm—Merriam, Marshall & Bicknell

[57] ABSTRACT

This disclosure relates to apparatus for preventing the nose dive produced when a motorcycle is sharply braked. The motor cycle includes a frame, front and rear wheels, and front and rear mounting means for connecting the wheels to the frame. The anti-nose-dive apparatus includes a generally U-shaped torsion bar having a center portion and front and rear arms. The center portion is rotatably mounted on the frame, the front arm is connected to the front mounting means, and the rear arm is connected to the rear mounting means. When the vehicle is moving and is sharply braked, the front end of the frame tends to move down relative to the front wheel. This action twists the torsion bar causing the rear mounting means to tend to rise. The reaction on the torsion bar causes the rear end of the frame to move down relative to the rear wheel, thereby reducing the amount of the nose dive.

9 Claims, 4 Drawing Figures

ANTI-NOSE-DIVE APPARATUS OF A MOTORCYCLE

This invention relates to an anti-nose-dive system for a motorcycle, which prevents or minimizes the "nose dive" action, i.e. the lowering of the front of the vehicle when the moving vehicle is quickly braked.

Braking a motorcycle that is moving at a high speed brings about excessive nose dive of its front due to momentum, relative to the change in position of its rear. This nose dive causes the angle of the rider's body to change and lowers his field of view momentarily, thereby reducing his driving maneuverability and requiring extra attention.

To overcome this problem, a device has already been offered which prevents only the front end of a motorcycle from lowering by narrowing the oil passages in the front oil fork shock absorbers when the vehicle is braked. This action decreases the cushioning effect and increases the damping at the front end of the vehicle. However, because this deals only with the front of the vehicle, an imbalance is formed in the cushioning effect between the front and rear ends of the vehicle. This may cause the vehicle to overturn even when striking a small obstacle, e.g. when the front wheel hits a projection on the road.

It is a general object of this invention to provide a system for preventing the change in angle of a motorcycle rider's body and the resultant change of his field of view due to the nose dive phenomenon, thereby enhancing the stability of his driving operation.

An anti-nose-dive apparatus in accordance with this invention is provided for use on a motorcycle having a frame, front and rear wheels both movable generally vertically relative to said frame, and front and rear mounting members respectively connected to and movable with said front and rear wheels and connecting said wheels to said frame. The apparatus comprises a torsion bar extending substantially in the direction of travel of said motorcycle and adapted to be journaled on said frame, said torsion bar terminating in front and rear arms which extend in one lateral direction relative to said direction of travel, a first rod adapted to pivotally interconnect said front arm and front member so that the relative vertical movement between said frame and the front wheel rotates said torsion bar, and a second rod adapted to pivotally interconnect said rear arm and rear member so that said rotation of said torsion bar tends to move said frame relative to said rear wheel.

Preferred embodiments of this invention will be described hereinafter with reference to the accompanying figures of the drawings, wherein.

Figure 1:
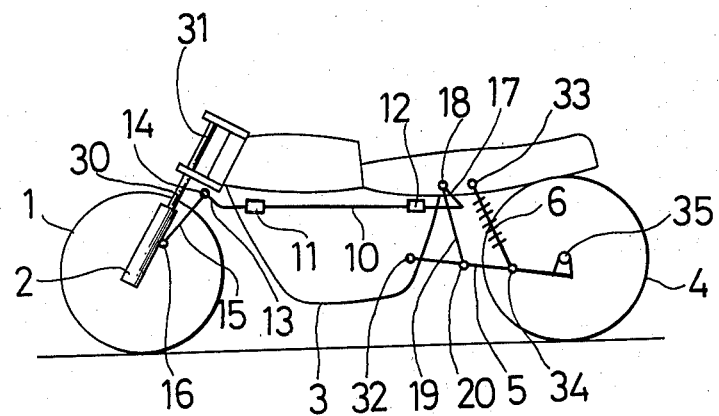
FIG. 1 is a diagrammatic side view of a motorcycle embodying this invention.
Figure 2:
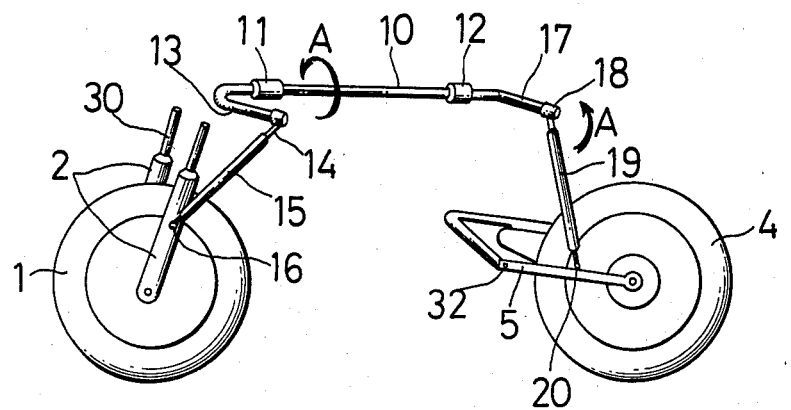
FIG. 2 is a diagrammatic perspective view of some parts shown in FIG. 1, but showing this invention in more detail.

Referring to FIGS. 1 and 2, the motorcycle has a front wheel 1, a rear wheel 4 and a frame 3. The front wheel is carried by a pair of bottom cylinders or sleeves 2 of a front fork 30 which has an upper part 31 rotatably fixed to the frame 3. The lower end portions of the upper part of fork 30 are supported telescopically within the sleeves 2, and resilient shock absorbers (not shown) connect the sleeves to the fork, so that the frame 3 moves resiliently relative to the sleeves 2 and the front wheel 1.

A pair of swing arms 5 pivotably carry the rear wheel 4 at a connection 35, and are pivotally supported at 32 on a rear part of frame 3. A pair of resilient rear shock absorbers 6 are connected at 33 to the frame 3 and at 34 to the swing arms 5, so that the frame 3 is able to move relative to the swing arms 5 and rear wheel 4.

The foregoing parts may all be conventional in construction, except for the parts required to connect with the apparatus of this invention. The motorcycle, of course, also includes an engine and the other customary operating parts.

A torsion bar 10 extends longitudinally or in the direction of travel of the vehicle and is on its right side, and it is journaled by a front bearing 11 and a rear bearing 12 on the frame 3. The front end portion of the bar 10 extends forwardly of the front bearing 11 and its rear end portion extends rearwardly of the rear bearing 12, and both turn to the left, thereby forming a front arm 13 and rear arm 17 as shown in FIG. 2.

The outer end of the front arm 13 is connected through a ball joint 14 to the upper end of a rod 15. The lower end of rod 15 is connected through another ball joint 16 to the left sleeve 2 of the front fork 30. Similarly, the outer end of rear arm 17 is connected through a ball joint 18 to the upper end of a rod 19, and the lower end of the rod 19 is connected through a ball joint 20 to the left swing arm 5. As shown in FIG. 1, the connections 20 and 34 are between the connections 32 and 35, and the connection 20 is between the connections 32 and 34.

The operation of the system will be explained with particular reference to FIG. 2.

When the vehicle is moving at a high speed and is sharply braked, the front portion of the frame 3 tends to lower relative to its rear portion, to the fork sleeves 2 and to front wheel 1 due to the momentum. This downward force of the front portion of the frame causes the front bearing 11 of torsion bar 10 to tend to lower relative to the ball joint 14. Since the distance from the ball joint 14 to the wheel and the cylinder 2 is fixed by the rod 15, the bar 10 angularly twists in the direction of the arrow A as the arm 13 tends to move upwardly relative to the frame 3 and the bearing 11. This twist also tends to move the rear arm 17 upwardly, which, due to the rod 19, tends to pivot the swing arms 5 upwardly in the counterclockwise direction about the connection 32. The twist further causes a downward reactive force from the arm 17, through the rear bearing 12 and to the frame 3. Accordingly, the rear of the frame 3 is kept from rising.

The downward force of the rear of the frame then causes the swing arms 5 to pivot counterclockwise on the point 32 and produces an upward reactive force by the compressive force of rear shock absorbers 6, now lifting the rear of the frame. As a result, the torsion bar 10 tends to angularly twist in the direction reverse to the arrow A, causing the front end of the frame to rise.

Thus, the relative movements of the front and rear parts of the motorcycle are transmitted through the torsion bar 10 and rods 15 and 19 to reduce the relative displacements between the front and rear of the vehicle. In addition, the damping effect of the rear shock absorbers 6, which would not be very operative when a conventional motorcycle is braked, can be utilized to reduce the pitching movement of the front of the vehicle, operating through the torsion bar 10.

Figure 3:
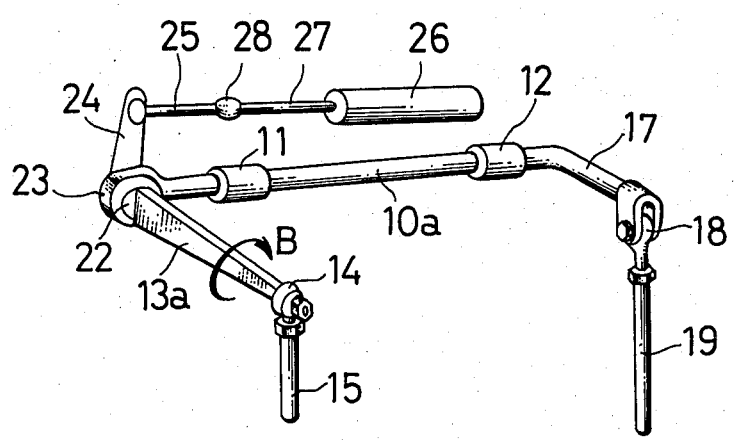
FIG. 3 is a perspective view of another embodiment of the invention.

FIG. 3 shows the second embodiment of the invention. In the same manner as the first embodiment of FIGS. 1 and 2, a torsion bar 10a is journaled by a front and rear bearings 11 and 12 on a motorcycle frame (not shown in FIG. 3) and has a turned rear arm 17 coupled through a ball joint 18 to a rod 19. However, the other end of torsion bar 10, which is forward of the front bearing 11, terminates in a bearing 23.

A front arm 13a extends in the same direction as the outer end portion of rear arm 17. The front arm forms an elongated plate, which in this specific example is rectangular in cross-section and is tapered. The arm 13a has an inner cylindrical end 22, which is journaled by the end bearing 23 of the torsion bar so that the arm 13a can rotate about the axis of its long dimension. The outer end of arm 13a is connected though a ball joint 14 to the top of a rod 15, in a manner similar to the first embodiment.

Secured to the outer side of the cylindrical inner end 22 of front arm 13a is one end of a lever or arm 24 which extends perpendicularly to the axis of the front arm 13a. The other end of lever 24 is connected to a link 25 which is connected through a ball joint 28 to the rod 27 of a master hydraulic cylinder 26. The master cylinder is fixed to the frame of the motorcycle and is coupled with the front and rear master cylinders (not shown) which produce braking pressure. When braking pressure is applied, the cylinder 26 simultaneously applies pressure on the rod 27.

FIG. 3 shows the positions of the parts when the vehicle is braked, at which time the rod 27 is moved out of the cylinder 26. This action turns the front arm 13a to move the plane of its wide dimension to be parallel to the axis of rod 15 which is generally vertical. Accordingly, the arm 13a functions as an element of high flexural rigidity against the vertical force applied on its outer end through the rod 15 when braking. This enables such a force from the rod 15 to act accurately on the torsion bar 10a, so that the anti-nose-dive system works sensitively.

Figure 4:
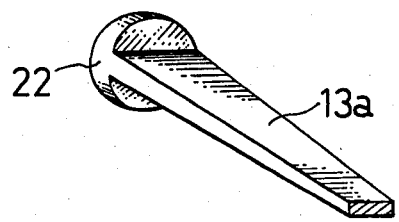
FIG. 4 is a perspective, fragmentary view of a part of the apparatus of FIG. 3 but showing a different position.

On the other hand, while the vehicle is moving normally without being braked, the rod 27 is retracted into the cylinder 26, thereby turning the front arm 13a in the direction shown by the arrow B to direct the plane of its wide dimension perpendicularly to the axis of rod 15, or generally horizontally as shown in FIG. 4. The front arm 13a then functions as a relatively thin, flexible element acting against the vertical forces, so that the torsion bar 10a, including the arm 13a, acts to the extent of an anti-pitch torsion bar to minimize the pitching of the vehicle going on a rough road surface.

Thus, the second embodiment prevents the vehicle from nose diving when braked and it prevents pitching, while retaining some shock absorption action when the vehicle is moving normally.

What is claimed is:

1. An anti-nose-dive apparatus for a motorcycle having a frame, front and rear wheels both movable in a generally vertical direction relative to said frame, and front and rear mounting members respectively connected to and movable with said front and rear wheels and connecting said wheels to said frame, said apparatus comprising a torsion bar extending generally in the direction of travel of said motorcycle and adapted to be journaled on said frame, said torsion bar terminating in front and rear arms which extend generally in the same lateral direction, first means adapted to pivotally interconnect said front arm with said front mounting member so that relative vertical movement between said frame and said front wheel rotates said torsion bar, and second means adapted to pivotally interconnect said rear arm with said rear mounting member so that said rotation of said torsion bar moves said frame relative to said rear wheel.

2. The apparatus of claim 1, wherein said front arm includes an elongated plate part which is rotatable relative to the remainder of said torsion bar to thereby change the plane of said plate part.

3. The apparatus of claim 2, wherein said motorcycle further includes a braking cylinder, and said apparatus includes third means adapted to connect the braking cylinder with said front arm for rotating said front arm when the cylinder produces braking pressure for said motorcycle.

4. The apparatus of any one of claims 1, 2 or 3, wherein said motorcycle further includes a front fork axially fixed to said frame and including a pair of bottom sleeves which are movable relative to said frame and which carry said front wheel, and a pair of swing arms which pivot on said frame and carry said rear wheel, said first means being connected to at least one of said bottom sleeves, and said second means being connected to at least one of said swing arms.

5. The apparatus of any one of claims 1, 2 and 3, wherein the motorcycle further includes shock absorbers connected between said frame and said rear mounting means.

6. A motorcycle including anti-nose-dive apparatus, comprising a frame, front and rear wheels, front and rear mounting means connecting said front and rear wheels to said frame, a generally U-shaped torsion bar including a center portion and front and rear arm portions, said center portion extending lengthwise of said frame and rotatably attached to said frame, first means connecting said front arm to said front mounting means, and second means connecting said rear arm to said rear mounting means.

7. Apparatus according to claim 6, wherein said rear mounting means includes a shock absorber.

8. Apparatus according to claim 6 or 7, wherein said front mounting means comprises a shock absorber including a cylinder attached to said front wheel and a rod attached to said frame, said front arm being connected to said cylinder.

9. Apparatus according to claim 6, wherein said front arm is adjustable between a highly rigid position and a relatively flexible position.

* * * * *